Sept. 11, 1928.  1,683,676
H. G. JUNGK
DYNAMO ELECTRIC MACHINE
Filed Dec. 15, 1924
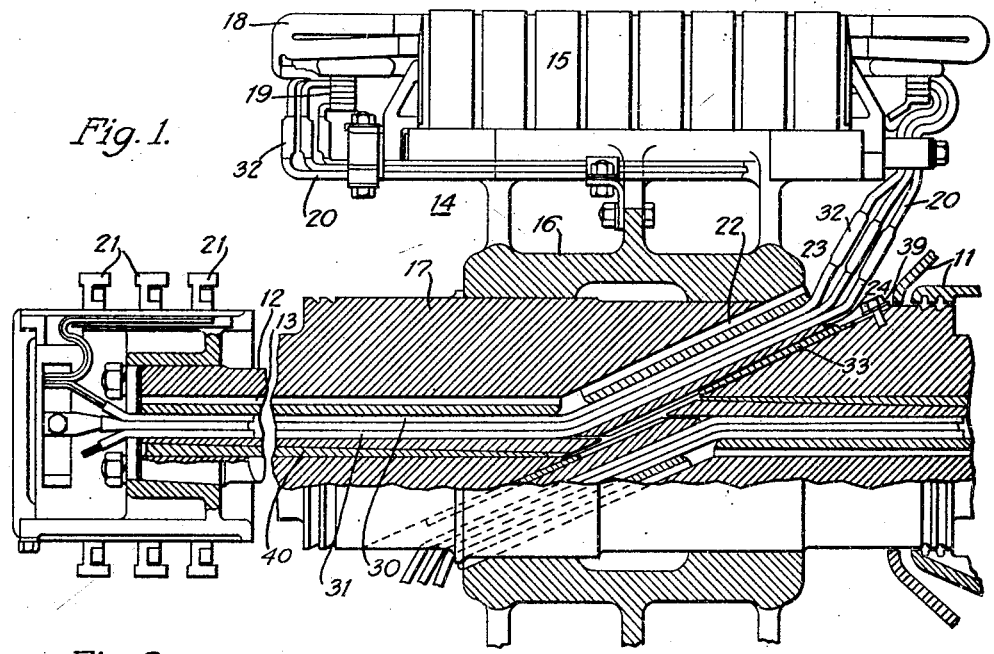
Fig. 1.
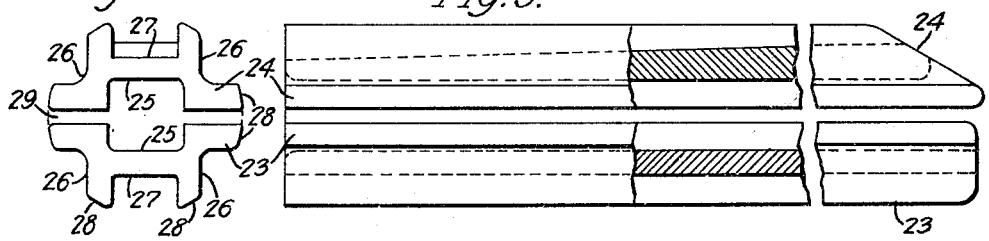
Fig. 2.  Fig. 3.
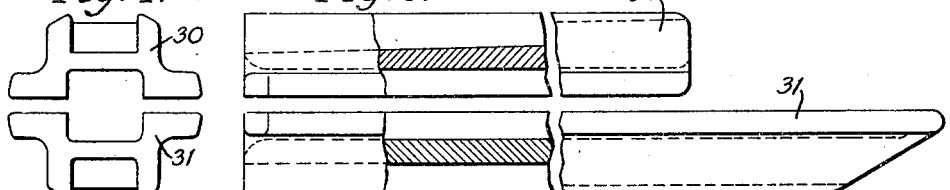
Fig. 4.  Fig. 5.
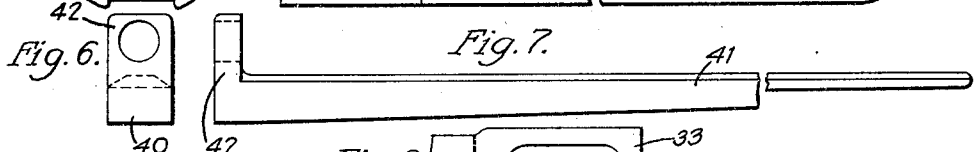
Fig. 6.  Fig. 7.
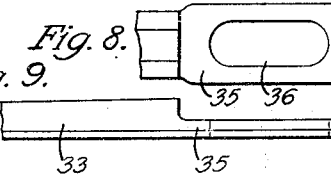
WITNESSES:  Fig. 9.  Fig. 10.  INVENTOR
G. S. Neilson  Herbert G. Jungk.
O. B. Buchanan  BY
Wesley S. Carr
ATTORNEY Patented Sept. 11, 1928.

1,683,676

UNITED STATES PATENT OFFICE.

HERBERT G. JUNGK, OF PITTSBURGH, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

Application filed December 15, 1924. Serial No. 755,840.

My invention relates to dynamo-electric machines, and it has particular relation to the mounting of the leads of a dynamo-electric machine in a hollow shaft thereof.

The object of my invention is to provide an inexpensive, trustworthy device for the purpose specified, which shall firmly retain the conductors without possibility of vibration, which shall increase the thermal capacity of said conductors, and which shall provide ventilating ducts whereby cooling air may pass through the perforations in the rotor of the dynamo-electric machine.

With the foregoing and other objects in view, my invention consists of the apparatus hereinafter described and illustrated in the accompanying drawing, wherein Figure 1 is a longitudinal sectional view of a machine embodying my invention, certain parts being broken away and omitted for simplicity of illustration.

Figs. 2 and 3 are end and side view, respectively, of a pair of guides fitting in the inclined perforation in the rotor.

Figs. 4 and 5 are similar views illustrating a pair of guides fitting in the longitudinal perforation in the shaft.

Figs. 6 and 7 are similar views of a wedge for retaining the guides in the shaft perforation; and Figs. 8, 9 and 10 are plan, side and end views, respectively, of a wedge for retaining the parts in the inclined perforation of the rotor.

My invention is shown applied to a dynamo-electric machine, the rotor member of which is shown in Fig. 1, a small portion of the stator being also indicated at 11 in said figure. The rotor member comprises a shaft 12, having a longitudinal perforation or duct 13, and a core structure 14 comprising laminations 15 and a spindle 16 on a large hub portion 17 of the shaft. The laminations 15 carry windings 18, which may be the secondary windings of an induction motor. The windings 18 are shown provided with cross-connections 19 and insulated leads or terminal conductors 20 leading to the slip rings 21 which may be mounted on the overhanging ends of the shaft outside of the bearings (not shown).

The conductors comprising the leads 20 pass through an inclined perforation 22 in the rotor or hub member, and through the longitudinal perforation 13 of the shaft. The conductors are retained in the inclined perforation 22 by means of two guides 23 and 24 which are preferably made of heat-conducting, non-magnetic material, such as aluminum, providing a metal-to-metal contact with the hub 17 for carrying the heat away from the conductors and thus increasing their current-carrying capacity. The aluminum guides also provide an equivalent air gap between the conductors and the walls of the perforation.

In the particular construction shown, there are two guides 23 and 24, although, in general, any number of guides may be utilized having a segmental cross section, that is, a cross section such that when the guides are assembled they will enclose the conductors within them. The inner surfaces of the guides are cut away, as indicated at 25, to receive the leads, and the outer surfaces of the guides are cut away, as indicated at 26 and 27, the cut-away portions 26 providing ventilating ducts between the guides and the walls of the perforation, and the cut-away portions 27 providing grooves for the insertion of wedge members hereinafter described. Preferably, the two guides are cast as an integral casting which is turned to the necessary diameter for the perforation, as indicated at 28, and is then cut in two, as indicated at 29 in Fig. 2.

Similar guides or retaining means for the conductors are provided in the longitudinal perforation 13 of the shaft, as indicated at 30 and 31. Except for the fact that these guides are made to fit the longitudinal shaft perforation 13, they are substantially identical with the guides 23 and 24 and no further description thereof is necessary.

In operation, the leads 20 are placed in the perforation and are electrically connected to the windings through suitable sleeve connections 32 or equivalent connecting means. The conductor-retaining guides are inserted in their respective perforations to retain the conductors in place. The guides 23 and 24 are retained in place by means of a wedge 33 having a tapered body portion 34 and a flat head 35 having an elongated perforation 36 for receiving a retaining bolt 39. The guides 30 and 31 are retained in place by means of a wedge 40 having an elongated tapered portion 41 and a head 42 in the shape of a laterally projecting perforated lug which is secured to the end of the shaft 12.

It will be seen that I have provided a construction comprising a relatively small number of readily assembled parts that provide adequate mechanical support for the leads, increasing their thermal capacity and decreasing their inductance, by virtue of the material from which the retaining means are constructed, and also providing ventilating ducts whereby cooling air may pass through the hollow shaft to the interior of the machine.

While I have illustrated my invention in a preferred form as applied to an alternating-current machine, it will be understood that my invention is not limited thereto or to use on dynamo-electric machines exclusively, as it is obviously applicable to any use where conductors must be retained within a duct. I desire, therefore, that the appended claims shall be given the broadest construction consistent with their terminology and the state of the art.

I claim as my invention:

1. The combination with a member having a straight duct for receiving one or more electrical conductors, of means extending substantially throughout the length of said duct for retaining said conductor or conductors in position within, and spacing said conductor or conductors from, the walls of said duct, said means comprising a plurality of parts of segmental cross-section, the inner surfaces of said parts being recessed to receive said conductor or conductors.

2. The combination with a member having a straight duct for receiving an electrical conductor, of means extending substantially throughout the length of said duct for retaining said conductor in position within said duct, said means comprising a plurality of parts of segmental cross-section, the inner surfaces of said parts being recessed to receive said conductor, the outer surfaces of said parts being recessed to provide ventilating openings between said retaining means and the walls of said duct.

3. The combination with a member having a straight duct for receiving one or more electrical conductors, of means extending substantially throughout the length of said duct for retaining said conductor or conductors in wedged position within said duct, said means comprising a plurality of parts of heat-conducting material and segmental cross-section, the inner surfaces of said parts being recessed to correspond to the outer surface of said conductor or conductors.

4. The combination with a member having a straight duct for receiving an electrical conductor, of means extending substantially throughout the length of said duct for retaining said conductor in position with said duct, said means comprising a plurality of parts of non-magnetic, heat-conducting material and segmental cross-section, the inner surfaces of said parts being recessed to receive said conductor, the outer surfaces of said parts being recessed to provide ventilating openings between said retaining means and the walls of said duct.

5. The combination with a member having a straight duct for receiving an electrical conductor, of means extending substantially throughout the length of said duct for retaining said conductor in position within said duct, said means comprising a pair of parts of heat-conducting material and segmental cross-section, the inner surfaces of said parts being recessed to receive said conductor, and additional wedge means bearing against the walls of said duct for holding said parts in position, the outer surfaces of at least one of said parts being grooved to receive said wedge means.

6. The combination with the rotor of an electrical machine having a straight duct for receiving an electrical conductor, of means extending substantially throughout the length of said duct in wedging engagement therewith for retaining said conductor in position within said duct, said means comprising a plurality of parts of segmental cross-section, the inner surfaces of said parts being recessed to receive said conductor.

7. The combination with the rotor of an electrical machine having a straight duct for receiving an electrical conductor, of means extending substantially throughout the length of said duct in wedging engagement therewith for retaining said conductor in position within said duct, said means comprising a plurality of parts of segmental cross-section, the inner surfaces of said parts being recessed to receive said conductor, the outer surfaces of said parts being recessed to provide ventilating openings between said retaining means and the walls of said duct.

8. A dynamo-electric machine having a rotor member comprising a shaft, a core structure, windings carried by said core structure and a current-collecting device carried by said shaft, said shaft being provided with a longitudinal perforation, said rotor member being provided with an inclined perforation leading to said shaft perforation, a conductor interconnecting said windings and said current-collecting device and disposed in said perforations, and means for retaining said conductor in position within each perforation, said means comprising a plurality of parts fitting around said conductor within the perforation.

9. A dynamo-electric machine having a rotor member comprising a shaft, a core structure, windings carried by said core structure and a current-collecting device carried by said shaft, said shaft being provided with a longitudinal perforation, said rotor member being provided with an inclined perforation leading to said shaft perforation, a conductor interconnecting said windings and said current-collecting device and disposed in said perforations, and means extending substantially throughout the length of each perforation for retaining said conductor in position, each of said means comprising a plurality of parts of segmental cross-section, the inner surfaces of said parts being recessed to receive said conductor, and the outer surfaces of said parts being recessed to provide ventilating ducts between the retaining means and the walls of the perforation.

10. A dynamo-electric machine having a rotor member comprising a shaft, a core structure, windings carried by said core structure and a current-collecting device carried by said shaft, said shaft being provided with a longitudinal perforation, said rotor member being provided with an inclined perforation leading to said shaft perforation, a conductor interconnecting said windings and said current-collecting device and disposed in said perforations, and means extending substantially throughout the length of each perforation in wedging engagement with the walls thereof for retaining said conductor in position, each of said means comprising a pair of parts of heat-conducting material and segmental cross-section, the inner surfaces of said parts being recessed to receive said conductor.

11. Apparatus including a conductor carrying alternating currents, a member having a straight duct for receiving said conductor, and means extending substantially throughout the length of said duct for retaining said conductor in position within said duct, said means comprising a plurality of separately removable parts of non-magnetic, heat-conducting material and segmental cross-section, the inner surface of said parts being recessed to receive said conductor, and the outer surfaces of said parts being provided with a plurality of recesses, some of which receive retaining wedges and some of which provide ventilating openings between said segmental parts and the walls of said duct.

12. Apparatus including a conductor carrying alternating currents, a member having two straight ducts intersecting each other at an angle for receiving said conductor, and means extending substantially throughout the length of each of said ducts for retaining said conductor in position within the related duct, said means comprising a plurality of separately removable parts of non-magnetic, heat-conducting material and segmental cross-section, the inner surfaces of said parts being recessed to receive said conductor, and the outer surfaces of said parts being provided with a plurality of recesses, some of which receive retaining wedges and some of which provide ventilating openings between said segmental parts and the walls of the related duct.

In testimony whereof, I have hereunto subscribed my name this 5th day of December, 1924.

HERBERT G. JUNGK.